United States Patent
Miyamoto

(10) Patent No.: US 8,428,329 B2
(45) Date of Patent: Apr. 23, 2013

(54) IMAGE PROCESSING APPARATUS, IMAGE PROCESSING METHOD, AND COMPUTER-READABLE MEDIUM

(75) Inventor: Hideaki Miyamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 712 days.

(21) Appl. No.: 12/268,837

(22) Filed: Nov. 11, 2008

(65) Prior Publication Data

US 2009/0129679 A1 May 21, 2009

(30) Foreign Application Priority Data

Nov. 16, 2007 (JP) ................................ 2007-298272

(51) Int. Cl.
- *G06K 9/20* (2006.01)
- *A61B 6/02* (2006.01)
- *H05G 1/64* (2006.01)

(52) U.S. Cl.
USPC .............................. 382/132; 378/42; 378/98.7

(58) Field of Classification Search .................. 382/128, 382/130, 131, 132; 378/41, 42, 65, 94, 95, 378/98.7
See application file for complete search history.

(56) References Cited

U.S. PATENT DOCUMENTS

| | | | | |
|---|---|---|---|---|
| 5,799,100 A * | 8/1998 | Clarke et al. | ................ | 382/132 |
| 5,987,094 A * | 11/1999 | Clarke et al. | ................ | 382/132 |
| 6,175,614 B1 * | 1/2001 | Jensen et al. | ................ | 378/98.7 |
| 6,463,121 B1 * | 10/2002 | Milnes | ................ | 378/62 |
| 6,711,433 B1 * | 3/2004 | Geiger et al. | ................ | 600/431 |
| 6,985,614 B2 * | 1/2006 | Shinbata | ................ | 382/132 |
| 6,990,175 B2 * | 1/2006 | Nakashima et al. | ................ | 378/65 |
| 7,502,642 B2 * | 3/2009 | Boese et al. | ................ | 600/424 |
| 7,519,155 B2 * | 4/2009 | Mollus et al. | ................ | 378/108 |
| 7,565,000 B2 * | 7/2009 | Capolunghi et al. | ................ | 382/128 |
| 7,570,792 B2 * | 8/2009 | Takahashi | ................ | 382/132 |
| 7,634,308 B2 * | 12/2009 | Ogawa | ................ | 600/431 |
| 7,680,307 B2 * | 3/2010 | Sathyanarayana | ................ | 382/128 |
| 7,689,042 B2 * | 3/2010 | Brunner et al. | ................ | 382/199 |
| 7,697,744 B2 * | 4/2010 | Ohishi | ................ | 382/132 |
| 7,751,523 B2 * | 7/2010 | Ohishi | ................ | 378/4 |
| 7,761,135 B2 * | 7/2010 | Pfister et al. | ................ | 600/424 |
| 7,949,170 B2 * | 5/2011 | Goto et al. | ................ | 382/131 |
| 8,115,821 B2 * | 2/2012 | Maki et al. | ................ | 348/222.1 |
| 2002/0018590 A1 | 2/2002 | Shinbata | | |
| 2005/0169509 A1 * | 8/2005 | Grasslin et al. | ................ | 382/130 |
| 2005/0169534 A1 | 8/2005 | Takahashi | | |
| 2006/0008131 A1 | 1/2006 | Shinbata | | |
| 2007/0071296 A1 * | 3/2007 | Nonaka et al. | ................ | 382/128 |

FOREIGN PATENT DOCUMENTS

| | | |
|---|---|---|
| JP | 2001-351101 A | 12/2001 |
| JP | 2003-116844 A | 4/2003 |
| JP | 2003-250789 A | 9/2003 |
| JP | 2003-339684 A | 12/2003 |
| JP | 2005-218581 A | 8/2005 |

(Continued)

*Primary Examiner* — Allen C. Ho

(74) *Attorney, Agent, or Firm* — Canon USA Inc IP Division

(57) ABSTRACT

A target region extracting unit configured to extract a target region used in acquiring feature information from each frame of a moving image includes a plurality of image analyzing units (first and second image analyzing units) configured to execute image analyzing processes in parallel for extraction of the target regions on each frame of the moving image in different manners, and an information transmission processing unit configured to execute a process of transmitting result information of the image analyzing processes among the plurality of image analyzing units.

17 Claims, 11 Drawing Sheets

FOREIGN PATENT DOCUMENTS

| JP | 2005-524511 | A | 8/2005 |
| JP | 2007-089763 | A | 4/2007 |
| JP | 3966461 | B2 | 8/2007 |

* cited by examiner

FIG. 3A
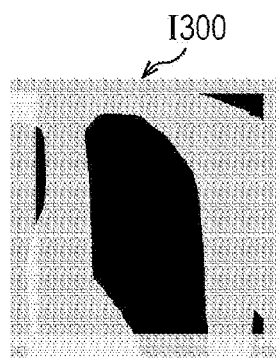
FIG. 3B     FIG. 3C     FIG. 3D
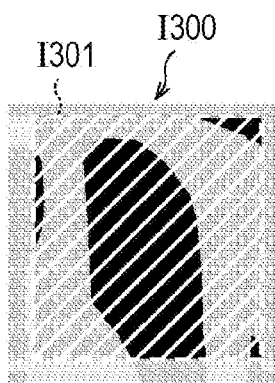 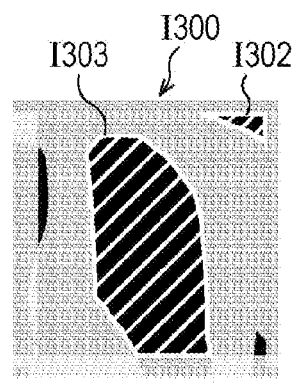 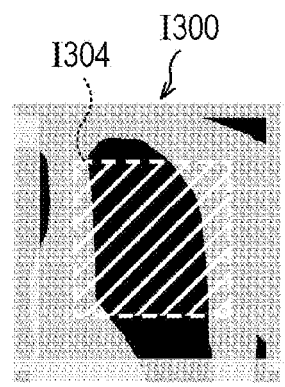

IMAGE PROCESSING APPARATUS, IMAGE PROCESSING METHOD, AND COMPUTER-READABLE MEDIUM

BACKGROUND OF THE INVENTION

1. Field of the Invention

The present invention relates to an image processing apparatus, an image processing method, and a computer-readable medium, which are suitable to execute image processing on each frame of a moving image.

2. Description of the Related Art

Recently, with the progress of digital technology, digital processing has been generally performed even on an image obtained with, e.g., medical X-ray fluoroscopy. In particular, a two-dimensional X-ray sensor capable of outputting an X-ray image as digital data has also been developed instead of the known radiography using films for X-ray diagnosis. Further, digital image processing, such as a gradation process, has become essential in an X-ray fluoroscopic apparatus using the two-dimensional X-ray sensor.

In the X-ray fluoroscopy, AEC (Auto Exposure Control) is performed by detecting a dose of X-rays passing through a subject and by controlling the X-ray dose to just a preset value. The AEC includes taking out feature information, such as an average value of an X-ray fluoroscopic image which is obtained by using pulse-like X-rays emitted from an X-ray generator, comparing a level of the feature information with a reference value, and controlling X-ray emission conditions so that the desired exposure is obtained. The X-ray emission conditions include the tube voltage and the tube current of the X-ray generator, the width of an X-ray pulse, etc.

In the image processing and the AEC which are performed in the X-ray fluoroscopic apparatus, a captured image is subjected to a process of extracting, from the image, a region of interest (target region) corresponding to an anatomic structure of a human body, which is the most important image section particularly from the diagnostic point of view, for the purpose of properly displaying the target region. Therefore, the X-ray fluoroscopic apparatus is required to acquire, from the extracted target region, feature information used for the image processing and the AEC.

The target region differs depending on the location of the radiographic subject and the purpose of radiography. In stomach fluoroscopy using barium, for example, a stomach wall is the target region to detect a polyp erupted on the stomach wall. As other examples, in taking a moving image of the chest, a lung field region is the target region, and in radiography with cardiac catheterization, the distal end of a catheter and a surrounding region thereof provide the target region.

When limiting an irradiation field region by a collimator mounted to the X-ray generator, if a region other than the irradiation field region is included in the target region, such a region impedes a process of acquiring proper feature information, and therefore it should be excluded from the target region. Similarly, if the target region includes a through-exposure region where X-rays directly enter the two-dimensional X-ray sensor without passing through a subject, or a region of, e.g., a metal piece where X-ray absorptance greatly differs from the subject, those regions impede the process of acquiring proper feature information, and therefore they should also be excluded from the target region.

A method of extracting the target region from an image has hitherto been widely practiced by a threshold process of setting a threshold for discriminating the target region and other regions, and extracting the target region on the basis of the threshold, or by an edge extraction process of extracting a contour shape of an object on the basis of a shading distribution shape of the image.

For example, Japanese Patent Laid-Open No. 2001-351101 discloses a method of executing gray level correction of a radiological image on the basis of image information that is acquired from the density of a subject region in the radiological image. More specifically, in Japanese Patent Laid-Open No. 2001-351101, the feature information regarding the subject region in the image can be stably extracted by removing a through-exposure region and by extracting image component information corresponding to, e.g., soft tissues of the subject. According to Japanese Patent Laid-Open No. 2001-351101, therefore, effective image processing can be performed, for example, even when a maximum pixel density value in the subject region in the radiological image is smaller than a predetermined pixel density value.

Japanese Patent Laid-Open No. 2005-218581 discloses a method of extracting an irradiation field region for optimizing an image processing parameter. According to Japanese Patent Laid-Open No. 2005-218581, an irradiation field candidate region is first obtained by giving a score to the likelihood of an irradiation field edge from a pattern of a target pixel and surrounding pixels for adaptation to a circular, polygonal or other collimator shape. Then, regarding the obtained irradiation field candidate region, shape feature information indicating, e.g., a degree of circularity is obtained to determine a shape of the irradiation field candidate region, and an irradiation field region is extracted according to an irradiation field recognition algorithm specific to the determined shape. At that time, accuracy is increased by employing, as the algorithm specific to the shape, a straight-line detection process, such as Hough transform, for a polygonal shape, or template matching with a circle for a circular shape.

Japanese Patent Laid-Open No. 2003-250789 discloses a method of, in fluoroscopy to produce images at a relatively slow frame rate of 3 to 5 frames per second (fps), extracting a target region for use in acquiring feature information in order to properly execute processing with respect to at least one of the AEC and image density conversion. According to the method disclosed in Japanese Patent Laid-Open No. 2003-250789, a quadratic differential is executed on image data in upward, downward, rightward and leftward directions to obtain, as a line (boundary line) circumscribing an irradiation field, a position where a differential value is maximized in each direction, and a process of extracting the target region is executed on the basis of the obtained line circumscribing the irradiation field. In Japanese Patent Laid-Open No. 2003-250789, the process of extracting the target region is executed by changing an extraction algorithm for each target region in response to information representing the location of a radiographic subject or to request information.

However, the algorithm for extracting the target region is generally complicated. Particularly, in an image processing apparatus for processing a large amount of images, such as presented by an X-ray fluoroscopic apparatus, it is very difficult to extract the target region with high accuracy during a time from X-ray emission to display of the image at a required high frame rate (e.g., 25 to 30 fps).

Thus, the above-described related techniques may be suitable for extracting the target region from an image obtained in the case of taking a still image or performing fluoroscopy at a relatively slow frame rate, but they have a difficulty in properly extracting the target region from a moving image captured at a high frame rate.

SUMMARY OF THE INVENTION

The present invention has been made in consideration of the above situation, and enables a target region to be properly extracted from each frame even for a moving image captured at a high frame rate.

According to an exemplary embodiment of the present invention, there is provided an image processing apparatus including a target region extracting unit configured to extract a target region used in acquiring feature information from each frame of a moving image, and a feature information acquiring unit configured to acquire the feature information on the basis of the target region extracted by the target region extracting unit. The target region extracting unit including a plurality of image analyzing units configured to execute image analyzing processes for extraction of the target regions on each frame of the moving image in different manners, and an information transmission processing unit configured to execute a process of transmitting result information of the image analyzing processes among the plurality of image analyzing units.

Other features and aspects of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 3A to 3D illustrate examples of images subjected to image processing in the X-ray fluoroscopic apparatus (image processing apparatus) according to the first exemplary embodiment of the present invention.

DESCRIPTION OF THE EMBODIMENTS

Embodiments of the present invention will be described in detail in accordance with the accompanying drawings.

A first exemplary embodiment of the present invention will be described below.

Figure 1:
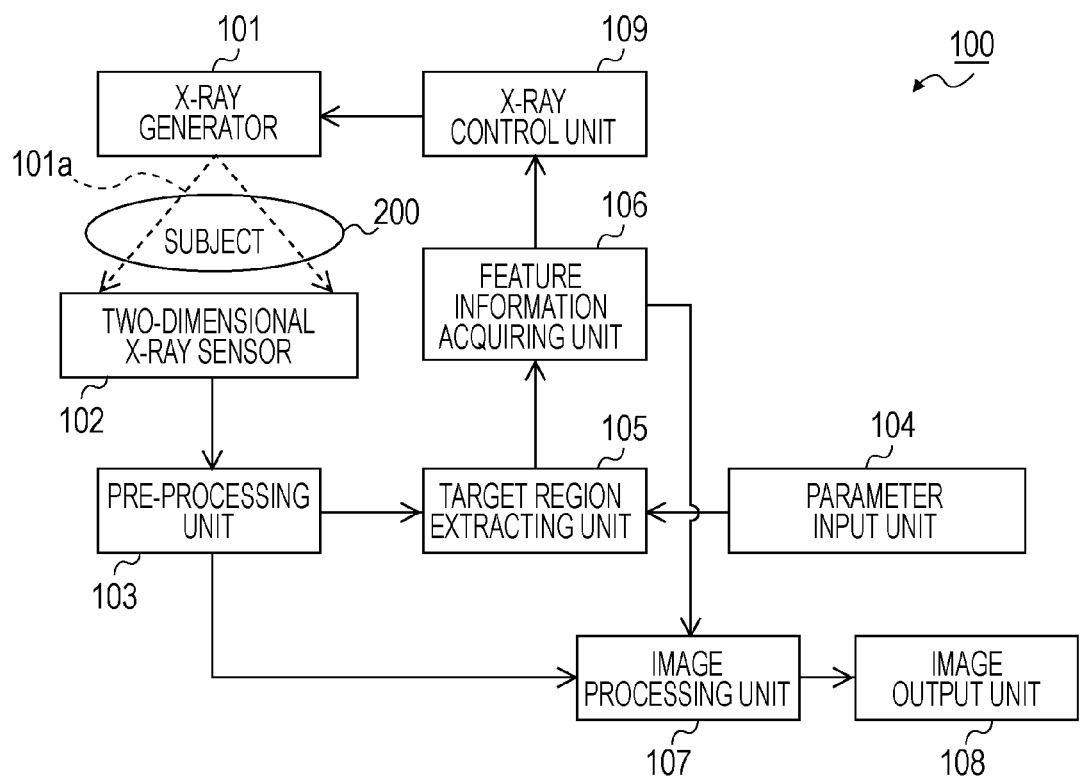
FIG. 1 is a block diagram of an exemplary functional configuration of an X-ray fluoroscopic apparatus (image processing apparatus) according to a first exemplary embodiment of the present invention.

FIG. 1 is a block diagram of an exemplary functional configuration of an X-ray fluoroscopic apparatus (image processing apparatus) according to a first exemplary embodiment of the present invention.

An X-ray fluoroscopic apparatus 100 includes an X-ray generator 101, a two-dimensional X-ray sensor 102, a pre-processing unit 103, a parameter input unit 104, a target region extracting unit 105, a feature information acquiring unit 106, an image processing unit 107, an image output unit 108, and an X-ray control unit 109.

When a moving image of a subject 200 is captured, the X-ray generator 101 serves as a radiation source for generating an X-ray 101a, i.e., one type of radiation, toward the subject 200. More specifically, the X-ray generator 101 generates the X-ray 101a with 3 to 30 pulses per second, for example, and irradiates (emits) the pulses of the X-ray 101a toward the subject 200.

The two-dimensional X-ray sensor 102 receives the X-ray 101a having passed through the subject 200 and produces a moving image in sync with the pulses of the X-ray 101a. The two-dimensional X-ray sensor 102 is constituted, for example, by arranging sensor elements in units of pixels, which detect the incident X-ray as an image signal, in a two-dimensional matrix array.

The pre-processing unit 103 executes pre-processing on each frame of the moving image output from the two-dimensional X-ray sensor 102.

The parameter input unit 104 inputs, to the target region extracting unit 105, various setting parameters entered from the exterior (e.g., an operator).

The target region extracting unit 105 executes a process of extracting the target region from each frame of the moving image that has been subjected to the pre-processing in the pre-processing unit 103. More specifically, the target region extracting unit 105 executes a process of extracting the target region that is used to acquire feature information from each frame of the moving image.

On the basis of the target region extracted by the target region extracting unit 105, the feature information acquiring unit 106 executes a process of acquiring the feature information from each frame of the moving image. More specifically, the feature information acquiring unit 106 acquires the feature information representing at least one of the position, the size, the shape, the average brightness value, the maximum brightness value, the minimum brightness value, the position of barycenter, the variance, and the standard deviation of the target region extracted by the target region extracting unit 105.

The image processing unit 107 executes image processing on each frame of the moving image, which has been subjected to the pre-processing in the pre-processing unit 103, by using the feature information acquired by the feature information acquiring unit 106. More specifically, the image processing unit 107 executes, on each frame of the moving image, image processing using at least one of a gray level conversion process, a sharpening process, a noise suppression process, and a process of cutting out the target region.

The image output unit 108 executes a process of outputting (such as displaying), as an X-ray fluoroscopic image, each frame of the moving image which has been subjected to the image processing in the image processing unit 107.

On the basis of the feature information acquired in the feature information acquiring unit 106, the X-ray control unit (radiation control unit) 109 controls the X-ray (radiation) 101a generated from the X-ray generator 101 which serves as the radiation source. More specifically, the X-ray control unit 109 executes control regarding X-ray emission conditions (radiation emission conditions) when the X-ray is emitted from the X-ray generator 101 next time. The X-ray emission conditions controlled on that occasion include the tube voltage and the tube current of the X-ray generator, the width of an X-ray pulse, etc.

The moving image captured by the X-ray fluoroscopic apparatus 100 includes a series of images obtained by X-ray fluoroscopy (radiation fluoroscopy) using the X-ray 101a that is generated from the X-ray generator 101 for irradiation to the subject 200.

Figure 2:
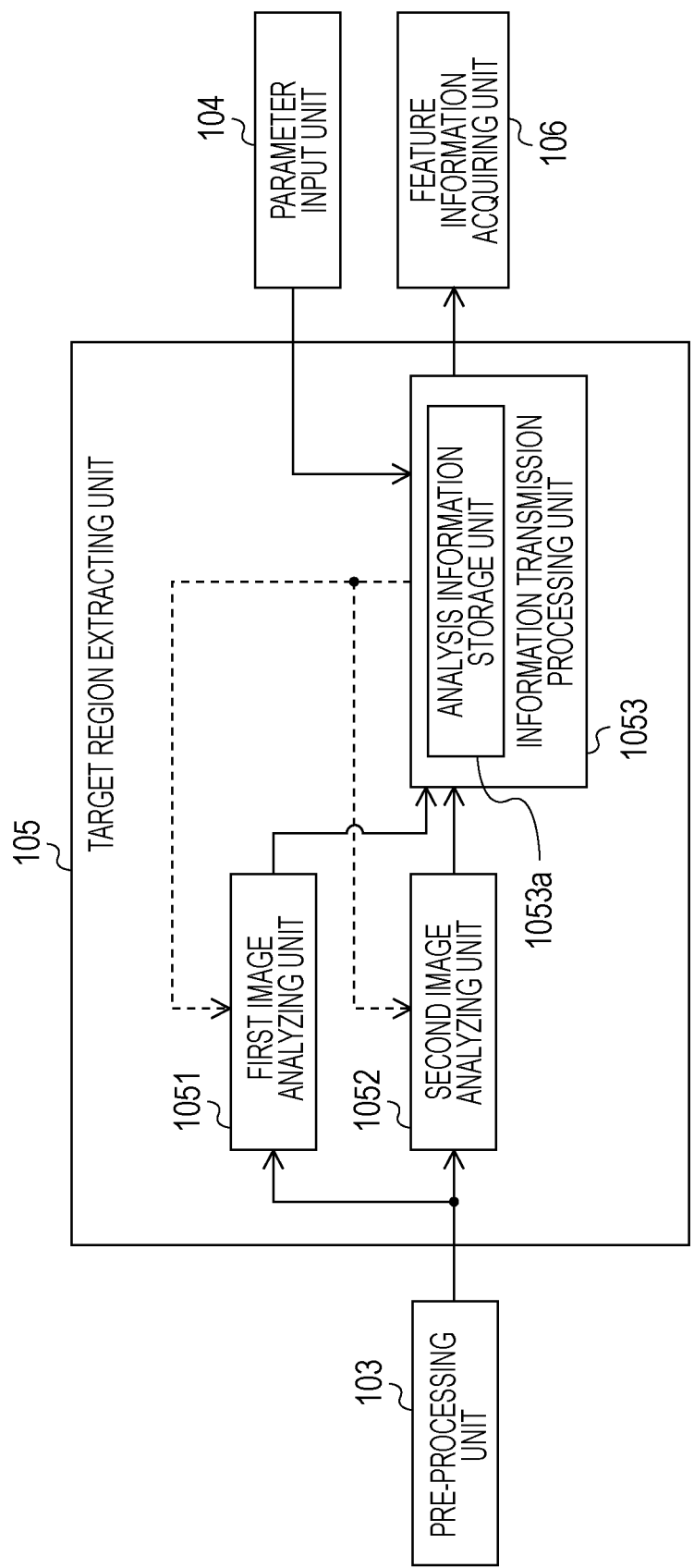
FIG. 2 is a block diagram of an exemplary internal configuration of a target region extracting unit in the X-ray fluoroscopic apparatus (image processing apparatus) according to the first exemplary embodiment of the present invention.

FIG. 2 is a block diagram of an exemplary internal configuration of the target region extracting unit in the X-ray fluoroscopic apparatus (image processing apparatus) according to the first exemplary embodiment of the present invention.

The target region extracting unit 105 in this exemplary embodiment includes a plurality of image analyzing units (e.g., a first image analyzing unit 1051 and a second image analyzing unit 1052 in an example illustrated in FIG. 2) which execute, on each frame of the moving image, image analyzing processes in parallel for extracting the target region by using different methods. Each of the plurality of image analyzing units executes, on each frame of the moving image, the image analyzing process using at least one of a histogram analysis process, an edge detection process with spatial filtering, a Hough transform process, a morphological operation process, and a pattern matching process.

Further, the target region extracting unit 105 in this exemplary embodiment includes an analysis information storage unit 1053a for storing at least part of result information (analysis information) of the image analyzing processes in order to mutually transmit the result information among the plurality of image analyzing units.

In the example of FIG. 2, for the simplicity of description, the target region extracting unit 105 is illustrated as including two image analyzing units, i.e., a first image analyzing unit 1051 and a second image analyzing unit 1052.

The first image analyzing unit 1051 executes, on an entire region of each frame of the moving image, the image analyzing process to extract the target region for use in acquiring the feature information. In other words, the first image analyzing unit 1051 executes a process of finely analyzing one image (one frame) and extracting the target region with high accuracy although the process takes a longer time.

The second image analyzing unit 1052 executes, on a partial region of each frame of the moving image, the image analyzing process to extract the target region for use in acquiring the feature information. More specifically, the second image analyzing unit 1052 executes a process of extracting the target region in a current frame, i.e., a processing target frame, while limiting an analysis range to a partial region of the frame on the basis of analysis information that has been obtained for one or more preceding frames by the first image analyzing unit 1051 or the second image analyzing unit 1052. With the second image analyzing unit 1052, a time required for the process of extracting the target region from the current frame can be shortened.

Still further, the target region extracting unit 105 includes an information transmission processing unit 1053 for executing a process of transmitting the result information of the image analyzing processes among the plurality of image analyzing units (e.g., the first image analyzing unit 1051 and the second image analyzing unit 1052 in the example illustrated in FIG. 2). At startup of the X-ray fluoroscopy, for example, the information transmission processing unit 1053 holds (stores), in the analysis information storage unit 1053a, edge position information of a predetermined region, i.e., a setting parameter entered from the parameter input unit 104. Further, whenever edge position information of the target region (i.e., the analysis information of the image analyzing process) is output from the first image analyzing unit 1051 or the second image analyzing unit 1052, for example, the information transmission processing unit 1053 holds (stores) the output edge position information in the analysis information storage unit 1053a with overwrite.

An algorithm used in the first image analyzing unit 1051 will be described below.

The algorithm used in the first image analyzing unit 1051 can be selected from various algorithms for each target region that is determined depending on the location of the radiographic subject and the purpose of radiography. This exemplary embodiment is described in connection with an example in which the chest of the subject 200 is taken as the radiographic subject.

FIGS. 3A to 3D illustrate examples of images subjected to image processing in the X-ray fluoroscopic apparatus (image processing apparatus) according to the first exemplary embodiment of the present invention.

FIG. 3A illustrates a chest image I300 which is an image to be analyzed by the target region extracting unit 105. FIG. 3B illustrates, by way of example, an irradiation field region I301 in the chest image I300, which is obtained by limiting an irradiation field with a collimator (not shown) mounted to the X-ray generator 101. FIG. 3C illustrates, by way of example, a through-exposure region I302 in the chest image I300 where the X-ray 101a directly enters the two-dimensional X-ray sensor 102 without passing through the subject 200 and a lung field region I303 that is the target region in the chest image I300. FIG. 3D illustrates, by way of example, a predetermined region I304 in the chest image I300, which is defined on the basis of the setting parameter (i.e., the edge position information of the predetermined region) entered from the parameter input unit 104.

Figure 4:
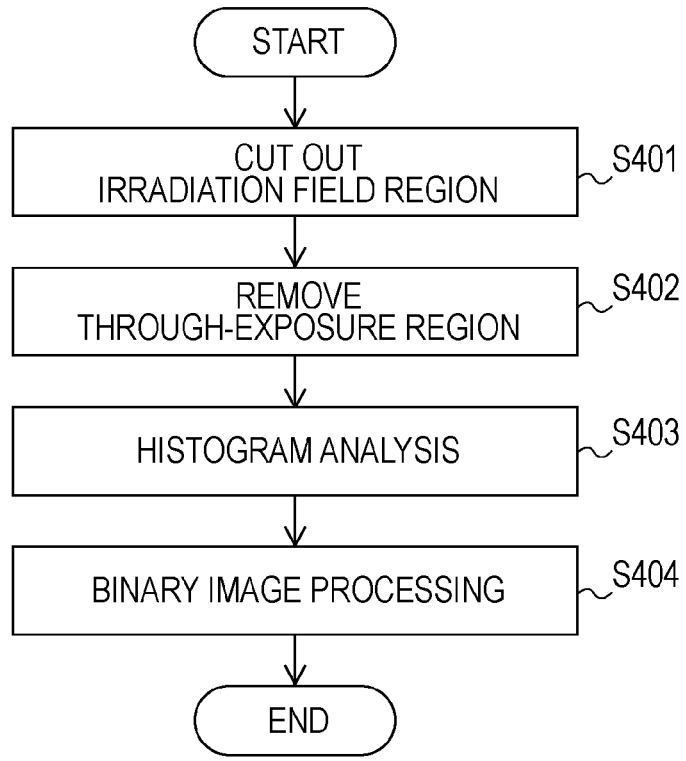
FIG. 4 is a flowchart of an example of a process of extracting the target region by a first image analyzing unit in the X-ray fluoroscopic apparatus (image processing apparatus) according to the first exemplary embodiment of the present invention.

FIG. 4 is a flowchart of an example of a process of extracting the target region by the first image analyzing unit in the X-ray fluoroscopic apparatus (image processing apparatus) according to the first exemplary embodiment of the present invention. Stated another way, the following description is made of a process of extracting the lung field region I303, which is the target region, from the chest image I300, shown in FIG. 3A, in the first image analyzing unit 1051 of the target region extracting unit 105.

First, in step S401, the first image analyzing unit 1051 extracts the irradiation field region I301, shown in FIG. 3B, from the chest image I300 shown in FIG. 3A.

Generally, an edge of a rectangular irradiation field region I301 can be easily extracted by detecting linear components with the Hough transform, for example, after the edge has been detected with the spatial filtering, for example, by utilizing the fact that a value of brightness greatly differs between the inside and the outside of the irradiation field region I301. More specifically, the first image analyzing unit 1051 extracts upper, lower, left and right edge lines defining an irradiation field region from the chest image I300 and cuts out (extracts) the irradiation field region I301 from the chest image I300 while the inside of the extracted edge lines is regarded as the irradiation field region.

In step S402, the first image analyzing unit 1051 excludes the through-exposure region I302, shown in FIG. 3C, from the cut-out irradiation field region I301.

Because the through-exposure region I302 shown in FIG. 3C represents a region where the X-ray 101a directly enters the two-dimensional X-ray sensor 102 without passing through the subject 200, the brightness value of the through-exposure region I302 has a maximum on the chest image I300 and its variance value is very small. Further, in the radiography for the chest of the subject 200, the through-exposure region I302 appears as a region adjacent to the end of the irradiation field region I301. By utilizing those characteristics, the first image analyzing unit 1051 extracts the through-exposure region I302 and prepares a mask acting such that the through-exposure region I302 is not used in subsequent analysis.

In step S403, the first image analyzing unit 1051 prepares a histogram for a region obtained by masking the through-exposure region I302 from the irradiation field region I301, to thereby perform a histogram analysis.

Figure 5:
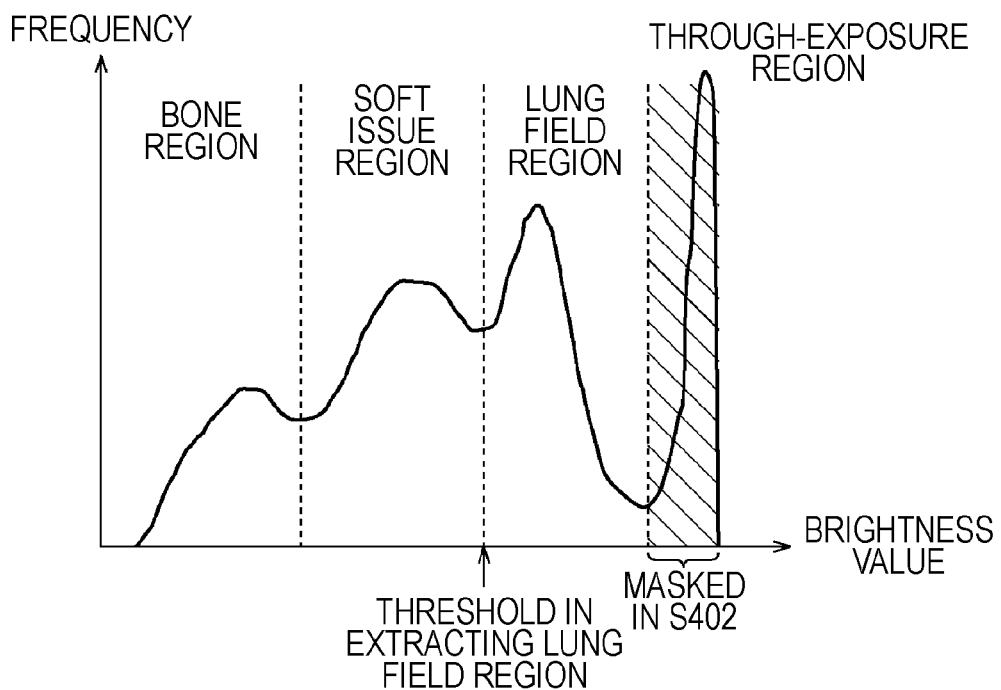
FIG. 5 is a graph illustrating an example of a histogram analysis executed in step S403 in the flowchart of FIG. 4.

FIG. 5 is a graph illustrating an example of the histogram analysis executed in step S403 in the flowchart of FIG. 4. In the graph of FIG. 5, the horizontal axis represents the brightness value of each pixel in the irradiation field region I301 of the chest image I300, and the vertical axis represents the frequency with respect to the brightness value of each pixel. Note that FIG. 5 illustrates a histogram representing respective frequencies at various brightness values in the form of curves (segments) interconnecting the maximum frequencies.

In FIG. 5, the through-exposure region I302 shown in FIG. 3C is excluded from the analysis range as a result of the masking (removal) in step S402. Therefore, the lung field region I303 as the target region can be roughly extracted with binary processing by setting, as a threshold, a value at the first valley on the histogram, counting from the maximum brightness value side.

In step S404, the first image analyzing unit 1051 executes binary image processing on the irradiation field region I301, which is obtained by excluding the through-exposure region I302 from the chest image I300, on the basis of the result of the histogram analysis executed in step S403. Then, the first image analyzing unit 1051 shapes an image region having been subjected to the binary image processing.

More specifically, when the first image analyzing unit 1051 shapes the image region, it can also extract the lunge field region I303 as one connected region by executing, e.g., an expansion/contraction process with the morphological operation such that the occurrence of regions leaking from the extraction and regions being erroneously extracted is avoided in a fine manner. The thus-obtained lunge field region I303 is provided as the target region.

While the target region extracting algorithm is described here in connection with the case that the lunge field region I303 is extracted as the target region in the chest image I300, this exemplary embodiment is not limited to that algorithm. For example, when a stomach wall is to be extracted as the target region in the stomach fluoroscopy using barium, the method disclosed in Japanese Patent Laid-Open No. 2003-250789 can be employed. In other words, an appropriate one of various algorithms can be selected depending on the target to be extracted.

Also, the details of processing executed by the first image analyzing unit 1051 vary depending on accuracy required in extraction of the target region. For example, when only the threshold for the binary processing is needed, the binary image processing in step S404 is not required. As an alternative, when higher accuracy is required, an additional process can be executed, for example, by obtaining area and position information of the extracted target region, holding area and position information of general chest tissues as a database, and comparing the former area and position information with the latter area and position information.

An algorithm used in the second image analyzing unit 1052 will be described below.

The algorithm used in the second image analyzing unit 1052 completes the analysis during a period from the emission of the X-ray to the output of the image (display of the image), for example, by limiting the analysis range for the current analysis target frame on the basis of the information that is held (stored) in the analysis information storage unit 1053a. The information utilized at that time is the result information obtained with the process of extracting the target region from one or more preceding frames, which is held (stored) in the analysis information storage unit 1053a, or the information of the setting parameter (i.e., the edge position information of the predetermined region I304) entered from the parameter input unit 104.

Figure 6A:
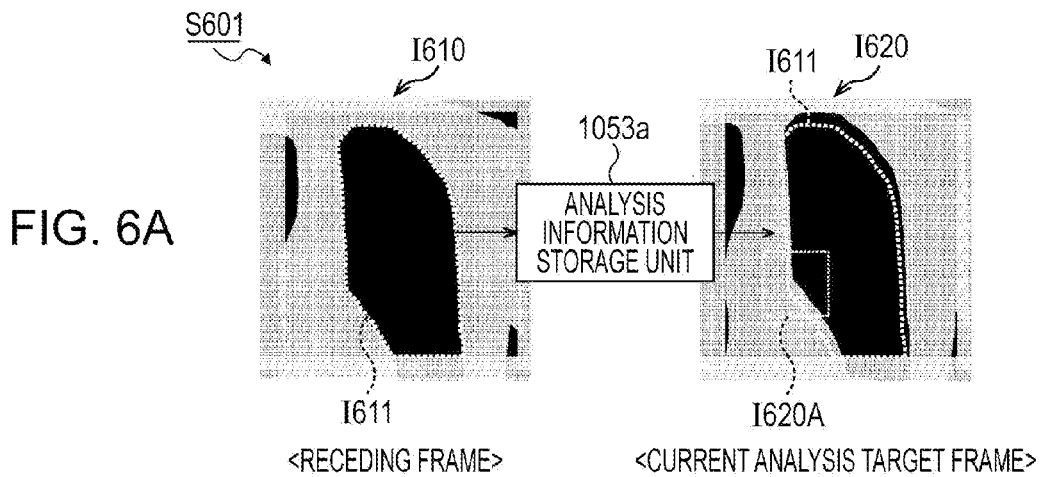
FIGS. 6A to 6C illustrate an example of a process of extracting the target region by a second image analyzing unit in the X-ray fluoroscopic apparatus (image processing apparatus) according to the first exemplary embodiment of the present invention.
Figure 6B:
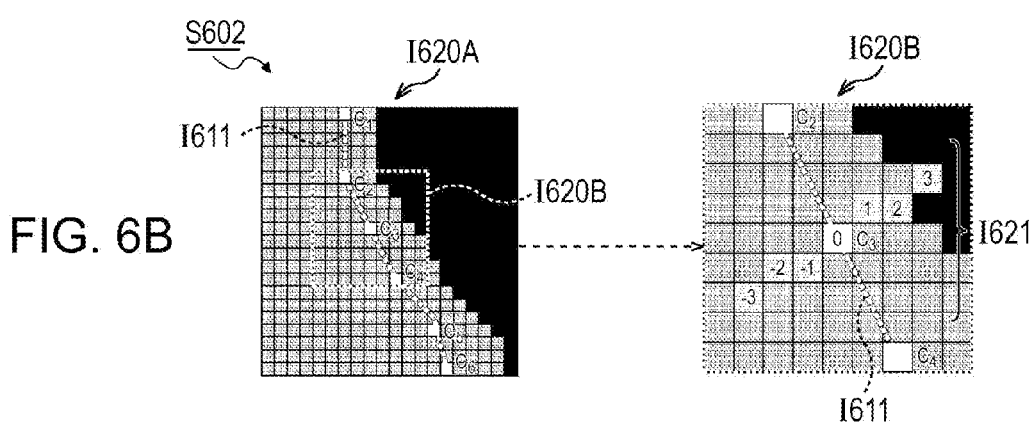
Figure 6C:
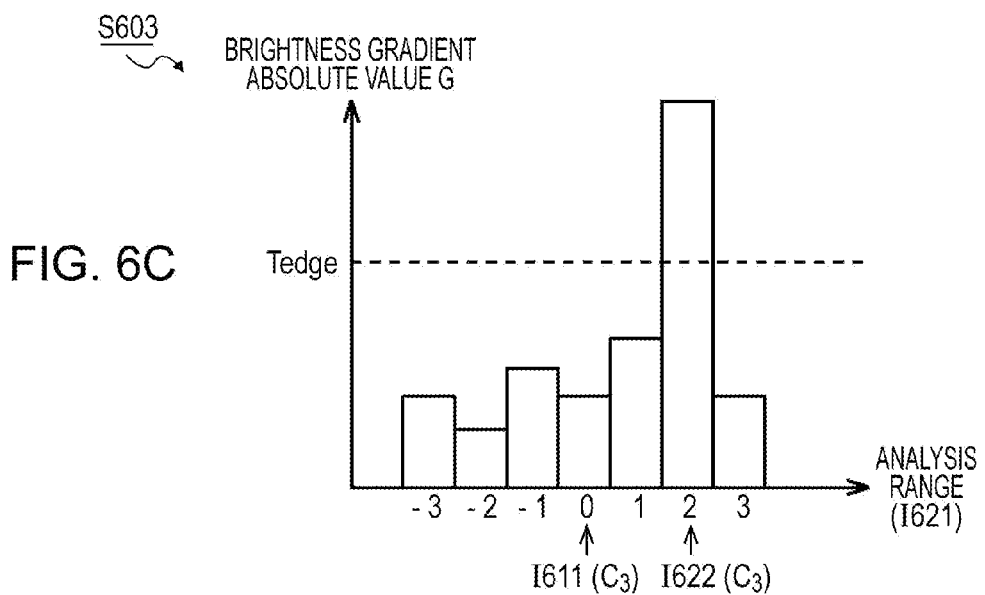

FIGS. 6A to 6C illustrate an example of the process of extracting the target region by the second image analyzing unit in the X-ray fluoroscopic apparatus (image processing apparatus) according to the first exemplary embodiment of the present invention.

First, in step S601 shown in FIG. 6A, the second image analyzing unit 1052 reads edge position information I611, i.e., the result information obtained with the process of extracting the target region from a preceding frame I610, which is held (stored) in the analysis information storage unit 1053a. Then, the second image analyzing unit 1052 executes a process of projecting a region based on the read edge position information I611 onto a current analysis target frame I620.

The edge position information I611 is provided by a number N of control points $C_i=(x_i, y_i)$ resulting from sampling edge pixels of the target region every five pixels. Note that the target region is represented by a closed curve, and $C_i$ and $C_1$ are control points adjacent to each other.

In step S602 shown in FIG. 6B, the second image analyzing unit 1052 determines, on the current analysis target frame I620, an analysis range I621 with respect to each control point $C_i$ of the projected edge position information I611. Each of I620A and I620B in FIG. 6B is an enlarged part of the current analysis target frame I620.

Herein, the analysis range I621 with respect to Ci=(Xi,Yi) is provided by seven pixels (−3, −2, −1, 0, 1, 2, 3) which are positioned about a pixel (Xi, Yi) and on a linear line passing the pixel (Xi, Yi) and extending perpendicularly to a linear line that interconnects Ci−1=(Xi−1, Yi−d and Ci+1=(Xi+1, Yi+d.

In step S603 shown in FIG. 6C, the second image analyzing unit 1052 calculates a brightness gradient absolute value G(x, y) at a pixel (x, y) for the analysis range I621 with respect to each control point $C_i$. Herein, the pixel (x, y) expressed by the following formula (1) is selected as an edge candidate point by using a threshold $T_{edge}$ that is experimentally determined, and the control point $C_i$ is updated by the coordinates of the selected pixel. When there are a plurality of edge candidate points, a pixel having a maximum value is selected for update of the control point $C_i$.

$$G(x,y) > T_{edge} \quad (1)$$

However, when the subject 200 moves considerably between the preceding frame I610 and the current analysis target frame I620, there is often no pixel, which satisfies the formula (1), in the analysis range I621 with respect to the control point $C_i$. Likewise, when the edge position information I611 held in the analysis information storage unit 1053a is provided by the predetermined region entered from the parameter input unit 104, there is often no pixel, which satisfies the formula (1), in the analysis range I621 with respect to the control point $C_i$. In those cases, the control point $C_i$ is not updated by the coordinates of a new pixel. The second image analyzing unit 1052 provides, as the result of extracting the target region in the current analysis target frame I620, a result of linear interpolation for a number N of control points $C_i$ obtained as described above, and it outputs the extraction result as the edge position information I622.

While the edge of the target region in the current analysis target frame I620 is extracted herein by using only the brightness gradient absolute value G in the analysis range I621, this exemplary embodiment is not limited to the above-described process. For example, the target region can also be extracted by utilizing various setting parameters in consideration of the edge shape, the area of the target region defined by edge components, an expected deformation of the target region, etc. Further, while the linear interpolation between the control points is performed in the above-described description in consideration of the processing time, curve interpolation such as spline interpolation can also be employed, for example, when the processing time has an allowance and a better extraction result is desired.

The first image analyzing unit 1051 can execute a detailed analysis on one image (one frame) and can extract the target region with high accuracy. However, the analysis process executed by the first image analyzing unit 1051 generally requires a long processing time until the result of extracting the target region is output. In the X-ray fluoroscopy with a frame rate of 30 fps, for example, the analysis process is not completed in some cases during a period from the emission of the X-ray to the display of the image. In this exemplary embodiment, therefore, the feature information is acquired using the analysis result of the second image analyzing unit 1052 during a period from the start to the end of the analysis by the first image analyzing unit 1051. The following description is made of the case that the first image analyzing unit 1051 causes a delay of two frames until the analysis result is output.

The second image analyzing unit 1052 can extract the target region at a high speed corresponding to a minute movement of the subject 200. On the other hand, since the second image analyzing unit 1052 executes the analysis process just within a limited range, there is a possibility that erroneous extraction of the target region is caused when the subject 200 moves to such a large extent that the edge of the target region is deviated to the outside of the analysis range. If information in the analysis information storage unit 1053a is overwritten with the result of erroneously extracting the target region, the image analysis is executed in subsequent frames by using the information of the result of erroneously extracting the target region, whereby errors are accumulated. To avoid such a drawback, in this exemplary embodiment, the analysis result information held in the analysis information storage unit 1053a is updated at timing when the analysis result of the first image analyzing unit 1051 is output.

Figure 7:
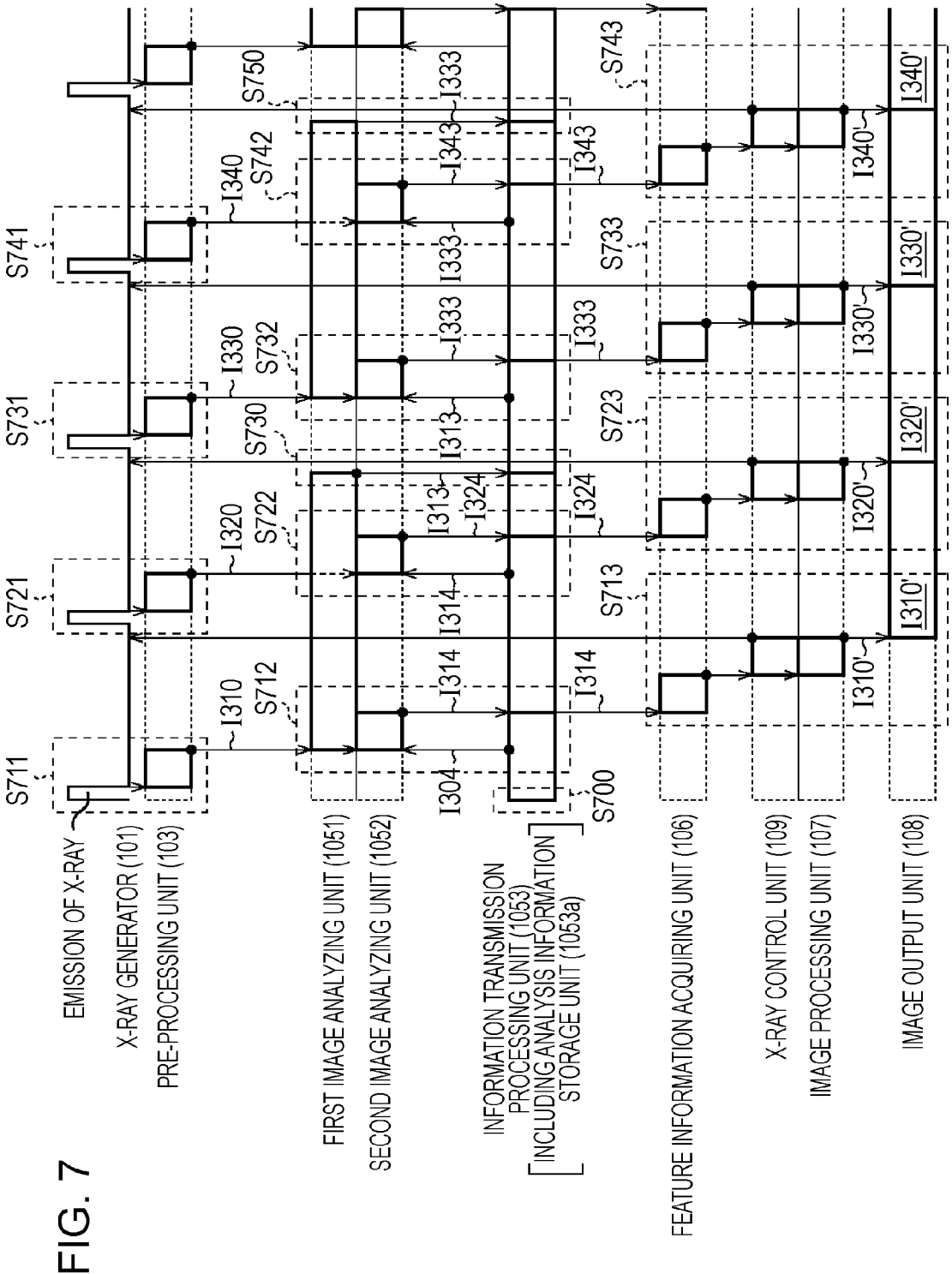
FIG. 7 is a timing chart illustrating one example of processing operations in the X-ray fluoroscopic apparatus (image processing apparatus) according to the first exemplary embodiment of the present invention.
Figure 8:
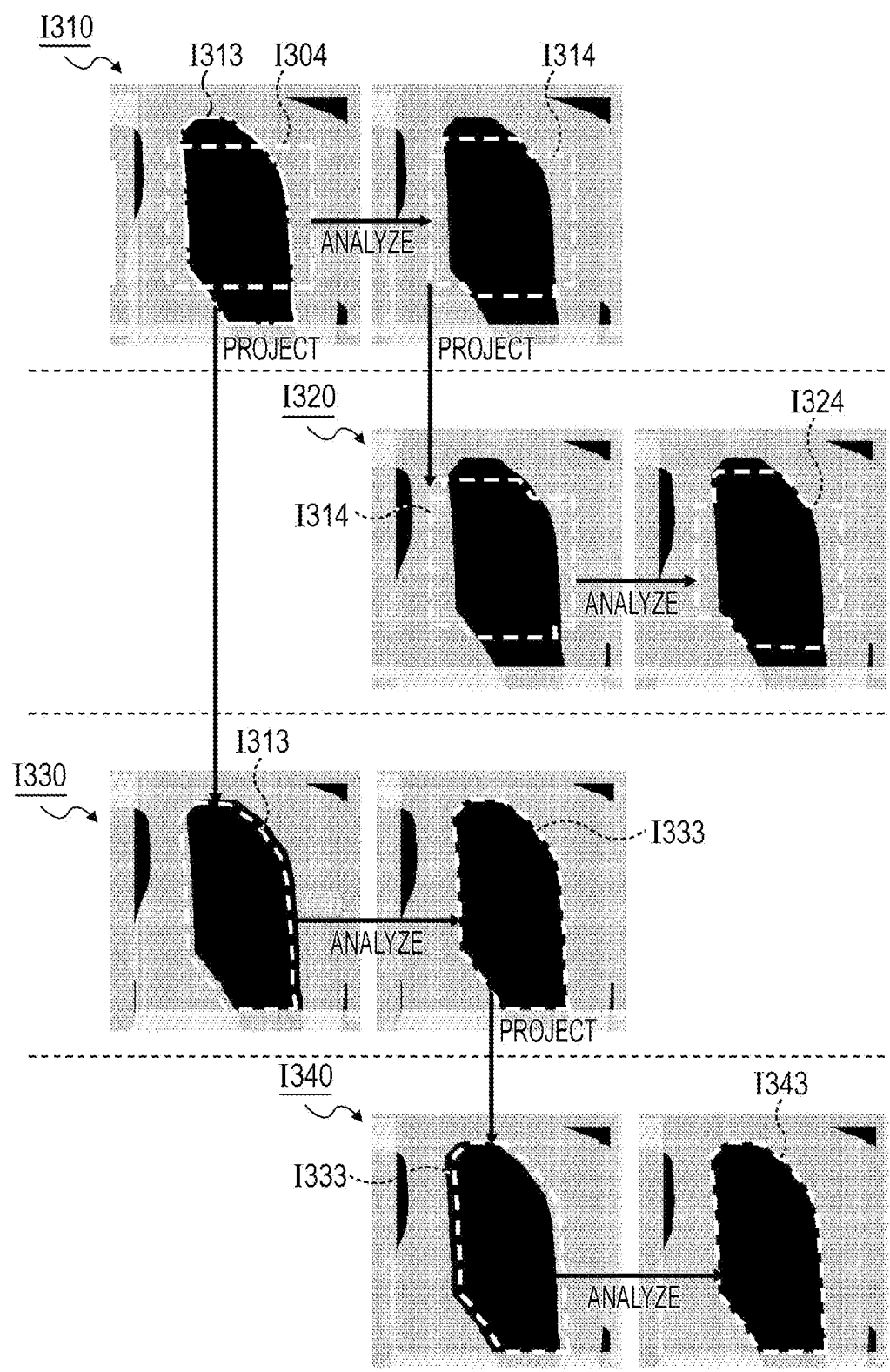
FIG. 8 illustrates images showing an exemplary flow of the process of extracting the target region, which is executed in the X-ray fluoroscopic apparatus (image processing apparatus) according to the first exemplary embodiment of the present invention.

FIG. 7 is a timing chart illustrating one example of processing operations in the X-ray fluoroscopic apparatus (image processing apparatus) according to the first exemplary embodiment of the present invention. FIG. 8 illustrates images showing an exemplary flow of the process of extracting the target region, which is executed in the X-ray fluoroscopic apparatus (image processing apparatus) according to the first exemplary embodiment of the present invention.

Prior to the start of the X-ray fluoroscopy, the information transmission processing unit 1053 first sets, in step S700 of FIG. 7, the predetermined region I304 on the basis of the edge position information of the predetermined region, which is entered from the parameter input unit 104.

The predetermined region I304 can be directly input by a doctor (or an operator) manipulating, e.g., a mouse to enter the edge position information on the basis of the shape of the target region. Alternatively, the predetermined region I304 can also be designated as a region which is located in a central portion of the captured image and which has a certain shape and size. In the case of the X-ray fluoroscopy, for example, where a moving image of the subject 200 causing movements is captured, it is impossible to externally input the appropriate predetermined region (target region) I304 corresponding to individual movements of the subject 200 through the parameter input unit 104 for update of the predetermined region per frame. For that reason, the predetermined region I304 is usually set at the start of the fluoroscopy as, e.g., a rectangular region which is located in the central portion of the captured image and which occupies 50% of the entirety of the captured image, and it is not updated in real time during the fluoroscopy. Because an image is generally captured in the radiography such that a location important from the diagnostic point of view is positioned at a center of the image, the predetermined region I304 is usually not deviated from the target region to a large extent, but it is not always optimum. It is here assumed that, as shown in FIG. 3D, the predetermined region I304 is set as a rectangular region in a central portion of the chest image I300.

In step S711 of FIG. 7, when the X-ray fluoroscopy is started, the X-ray generator 101 emits a first pulse of the X-ray 101a toward the subject 200. The first pulse of the X-ray 101a passes through the subject 200 while gradually attenuating, and enters the two-dimensional X-ray sensor 102. The two-dimensional X-ray sensor 102 outputs an X-ray image of first frame. The pre-processing unit 103 executes pre-processing, such as an offset correction process and a gain correction process, on the X-ray image of the first frame output from the two-dimensional X-ray sensor 102. The X-ray image of the first frame having been subjected to the pre-processing in the pre-processing unit 103 is provided as an X-ray image I310 shown in FIG. 8. In step S712 of FIG. 7, the target region extracting unit 105 starts a process of extracting the target region from the X-ray image I310 of the first frame, which has been subjected to the pre-processing in the pre-processing unit 103. More specifically, the process of step S712 in FIG. 7 is executed as follows.

The first image analyzing unit 1051 starts the image analyzing process shown in FIG. 4, but the result of extracting the target region is output, as shown in FIG. 7, after two frames (i.e., after capturing an X-ray image I320 of a second frame shown in FIG. 8).

The second image analyzing unit 1052 projects, as shown in FIG. 8, the edge position information of the predetermined region I304, which is held in the analysis information storage unit 1053a, onto the X-ray image I310 of the current frame (first frame). The second image analyzing unit 1052 then analyzes a nearby region of the X-ray image I310 of the first frame to extract a target region I314 of a first frame. Further, the second image analyzing unit 1052 writes edge position information based on the target region I314, for example, in the analysis information storage unit 1053a. At that time, the second image analyzing unit 1052 overwrites the edge position information of the predetermined region I304 with the edge position information based on the target region I314, for example, so that the latter is held (stored) in the analysis information storage unit 1053a. Further, the target region extracting unit 105 outputs the edge position information with respect to the target region I314, as target-region extraction result information of the first frame, to the feature information acquiring unit 106.

Herein, the second image analyzing unit 1052 executes the process of extracting the target region in accordance with the algorithm described above with reference to FIG. 5. However, the edge position information of the preceding frame on that occasion is provided as the predetermined region I304 based on the setting parameter which is entered from the parameter input unit 104. Accordingly, many control points are not updated because it is not assured that an edge to be extracted exists in the analysis range for the control points. As a result, the target region I314, shown in FIG. 8, is output such that only a part of the edge of the predetermined region I304, which is located near the lung field region, is corrected and the other part of the edge away from the lung field region is not moved from the edge of the predetermined region I304.

In step S713 of FIG. 7, the feature information acquiring unit 106 acquires feature information on the basis of the edge position information with respect to the target region I314 (i.e., the target-region extraction result information of the first frame) which is output from the target region extracting unit 105.

The image processing unit 107 executes image processing for the X-ray image I310 of the first frame by using the feature information acquired by the feature information acquiring unit 106. Then, the image processing unit 107 outputs the X-ray image I310 after the image processing, as an X-ray image I310' of the first frame, to the image output unit 108. The image output unit 108 executes an outputting process of, e.g., displaying the X-ray image I310' of the first frame. On the other hand, the X-ray control unit 109 calculates X-ray emission conditions of the X-ray generator 101 regarding the X-ray fluoroscopy for a second frame by using the feature information acquired by the feature information acquiring unit 106. The process of the X-ray fluoroscopy for the first frame is thus completed.

In step S721 of FIG. 7, the X-ray generator 101 emits a second pulse of the X-ray 101a toward the subject 200 on the basis of the X-ray emission conditions calculated by the X-ray control unit 109 in step S713. Thereafter, a process similar to that of step S711 is executed until the pre-processing in the pre-processing unit 103, whereby an X-ray image I320 of the second frame, shown in FIG. 8, is produced.

In step S722 of FIG. 7, the target region extracting unit 105 starts a process of extracting the target region from the X-ray image I320 of the second frame, which has been subjected to the pre-processing in the pre-processing unit 103. More specifically, the process of step S722 in FIG. 7 is executed as follows.

The first image analyzing unit 1051 continues the image analyzing process for the X-ray image I310 of the first frame because the image analyzing process for the X-ray image I310 of the first frame is not yet completed.

As shown in FIG. 8, the second image analyzing unit 1052 reads the edge position information based on the target region I314, which is held in the analysis information storage unit 1053a at the current time, and projects it onto the X-ray image I320 of the second frame. Further, the second image analyzing unit 1052 analyzes a region near the edge position of the target region I314, shown in FIG. 8, with respect to the X-ray image I320 of the second frame and extracts a target region I324 of a second frame shown in FIG. 8. Then, the second image analyzing unit 1052 writes the edge position information based on the target region I324, for example, in the analysis information storage unit 1053a. At that time, the second image analyzing unit 1052 overwrites the edge position information based on the target region I314 with the edge position information based on the target region I324, for example, so that the latter is held (stored) in the analysis information storage unit 1053a. Further, the target region extracting unit 105 outputs the edge position information of the target region I324, as target-region extraction result information of the second frame, to the feature information acquiring unit 106.

In step S723 of FIG. 7, the feature information acquiring unit 106 acquires feature information on the basis of the edge position information with respect to the target region I324 (i.e., the target-region extraction result information of the second frame) which is output from the target region extracting unit 105.

The image processing unit 107 executes image processing for the X-ray image I320 of the second frame by using the feature information acquired by the feature information acquiring unit 106. Then, the image processing unit 107 outputs the X-ray image I320 after the image processing, as an X-ray image I320' of the second frame, to the image output unit 108. The image output unit 108 executes an outputting process of, e.g., displaying the X-ray image I320' of the second frame. On the other hand, the X-ray control unit 109 calculates X-ray emission conditions of the X-ray generator 101 regarding the X-ray fluoroscopy for a third frame by using the feature information acquired by the feature information acquiring unit 106. The process of the X-ray fluoroscopy for the second frame is thus completed.

In step S730 of FIG. 7, after completion of the image analyzing process for the X-ray image I310 of the first frame, the first image analyzing unit 1051 writes, in the analysis information storage unit 1053a, the edge position information based on the target region I313 obtained as the result of the image analyzing process. At that time, the first image analyzing unit 1051 overwrites the edge position information based on the target region I324 with the edge position information based on the target region I313, for example, so that the latter is held (stored) in the analysis information storage unit 1053a. The target region I313 has been subjected to the detailed image analyzing process for all pixels of the X-ray image I310 of the first frame. Accordingly, the target region I313 is obtained as more desirable one than the target regions I314 and I324 obtained as the result of the image analyzing processes which have been each executed on the limited region near the edge position of the predetermined region I304.

In step S731 of FIG. 7, the X-ray generator 101 emits a third pulse of the X-ray 101a toward the subject 200 on the basis of the X-ray emission conditions calculated by the X-ray control unit 109 in step S723. Thereafter, a process similar to that of step S711 (or step S721) is executed until the pre-processing in the pre-processing unit 103, whereby an X-ray image I330 of the third frame, shown in FIG. 8, is produced.

In step S732 of FIG. 7, the target region extracting unit 105 starts a process of extracting the target region from the X-ray image I330 of the third frame, which has been subjected to the pre-processing in the pre-processing unit 103. More specifically, the process of step S732 in FIG. 7 is executed as follows.

The first image analyzing unit 1051 starts the image analyzing process for the X-ray image I330 of the third frame because the image analyzing process for the X-ray image I310 of the first frame has been completed. The timing at which the target region extraction result by the first image analyzing unit 1051 is output is, as seen from FIG. 7, after two frames.

As shown in FIG. 8, the second image analyzing unit 1052 reads the edge position information based on the target region I313, which is held in the analysis information storage unit 1053a at the current time, and projects it onto the X-ray image I330 of the third frame. Further, the second image analyzing unit 1052 analyzes a region near the edge position of the target region I313, shown in FIG. 8, with respect to the X-ray image I330 of the third frame and extracts a target region I333 of a third frame shown in FIG. 8. Then, the second image analyzing unit 1052 writes the edge position information based on the target region I333, for example, in the analysis information storage unit 1053a. At that time, the second image analyzing unit 1052 overwrites the edge position information based on the target region I313 with the edge position information based on the target region I333, for example, so that the latter is held (stored) in the analysis information storage unit 1053a. Further, the target region extracting unit 105 outputs the edge position information with respect to the target region I333, as target-region extraction result information of the third frame, to the feature information acquiring unit 106.

In step S733 of FIG. 7, the feature information acquiring unit 106 acquires feature information on the basis of the edge position information with respect to the target region I333 (i.e., the target-region extraction result information of the third frame) which is output from the target region extracting unit 105.

The image processing unit 107 executes image processing for the X-ray image I330 of the third frame by using the feature information acquired by the feature information acquiring unit 106. Then, the image processing unit 107 outputs the X-ray image I330 after the image processing, as an X-ray image I330' of the third frame, to the image output unit 108. The image output unit 108 executes an outputting process of, e.g., displaying the X-ray image I330' of the third frame. On the other hand, the X-ray control unit 109 calculates X-ray emission conditions of the X-ray generator 101 regarding the X-ray fluoroscopy for a fourth frame by using the feature information acquired by the feature information acquiring unit 106. The process of the X-ray fluoroscopy for the third frame is thus completed.

In step S741 of FIG. 7, the X-ray generator 101 emits a fourth pulse of the X-ray 101a toward the subject 200 on the basis of the X-ray emission conditions calculated by the X-ray control unit 109 in step S733. Thereafter, a process similar to that of step S711 (or step S721 or S731) is executed until the pre-processing in the pre-processing unit 103, whereby an X-ray image I340 of the fourth frame, shown in FIG. 8, is produced.

In step S742 of FIG. 7, the target region extracting unit 105 starts a process of extracting the target region from the X-ray image I340 of the fourth frame, which has been subjected to the pre-processing in the pre-processing unit 103. More specifically, the process of step S742 in FIG. 7 is executed as follows.

The first image analyzing unit 1051 continues the image analyzing process for the X-ray image I330 of the third frame because the image analyzing process for the X-ray image I330 of the third frame is not yet completed.

As shown in FIG. 8, the second image analyzing unit 1052 reads the edge position information based on the target region I333, which is held in the analysis information storage unit 1053a at the current time, and projects it onto the X-ray image I340 of the fourth frame. Further, the second image analyzing unit 1052 analyzes a region near the edge position of the target region I333, shown in FIG. 8, with respect to the X-ray image I340 of the fourth frame and extracts a target region I343 of a fourth frame shown in FIG. 8. Then, the second image analyzing unit 1052 writes the edge position information based on the target region I343, for example, in the analysis information storage unit 1053a. At that time, the second image analyzing unit 1052 overwrites the edge position information based on the target region I333 with the edge position information based on the target region I343, for example, so that the latter is held (stored) in the analysis information storage unit 1053a. Further, the target region extracting unit 105 outputs the edge position information with respect to the target region I343, as target-region extraction result information of the fourth frame, to the feature information acquiring unit 106.

In step S743 of FIG. 7, the feature information acquiring unit 106 acquires feature information on the basis of the edge position information with respect to the target region I343 (i.e., the target-region extraction result information of the fourth frame) which is output from the target region extracting unit 105.

The image processing unit 107 executes image processing for the X-ray image I340 of the fourth frame by using the feature information acquired by the feature information acquiring unit 106. Then, the image processing unit 107 outputs the X-ray image I340 after the image processing, as an X-ray image I340' of the fourth frame, to the image output unit 108. The image output unit 108 executes an outputting process of, e.g., displaying the X-ray image I340' of the fourth frame. On the other hand, the X-ray control unit 109 calculates X-ray emission conditions of the X-ray generator 101 regarding the X-ray fluoroscopy for a fifth frame by using the feature information acquired by the feature information acquiring unit 106. The process of the X-ray fluoroscopy for the fourth frame is thus completed.

In step S750 of FIG. 7, after completion of the image analyzing process for the X-ray image I330 of the third frame, the first image analyzing unit 1051 writes, in the analysis information storage unit 1053a, the edge position information based on the target region I333 obtained as the result of the image analyzing process. At that time, the first image analyzing unit 1051 overwrites the edge position information based on the target region I343 with the edge position information based on the target region I333, for example, so that the latter is held (stored) in the analysis information storage unit 1053a. The target region I333 has been subjected to the detailed image analyzing process for all pixels of the X-ray image I330 of the third frame. Accordingly, this target region I333 is obtained as a result comparable to the target region I333 obtained as the result of the image analyzing process in step S732, which has been executed on the limited region near the edge position of the target region I313.

According to the X-ray fluoroscopic apparatus 100 of this exemplary embodiment, as described above, when the process of extracting the target region from each frame of the moving image is performed, two types of image analyzing processes are executed in parallel by the first image analyzing unit 1051 and the second image analyzing unit 1052. Further, the first image analyzing unit 1051 and the second image analyzing unit 1052 hold the respective image analysis result information in the analysis information storage unit 1053a of the information transmission processing unit 1053 and execute the image analyzing processes in a manner of mutually compensating the respective image analysis result information.

As a result, a more appropriate target region can be extracted in real time for each frame of the moving image captured at a high frame rate. In addition, the image processing by the image processing unit 107 and the X-ray control by the X-ray control unit 109 can be more appropriately executed by acquiring the feature information on the basis of the target region.

Figure 9:
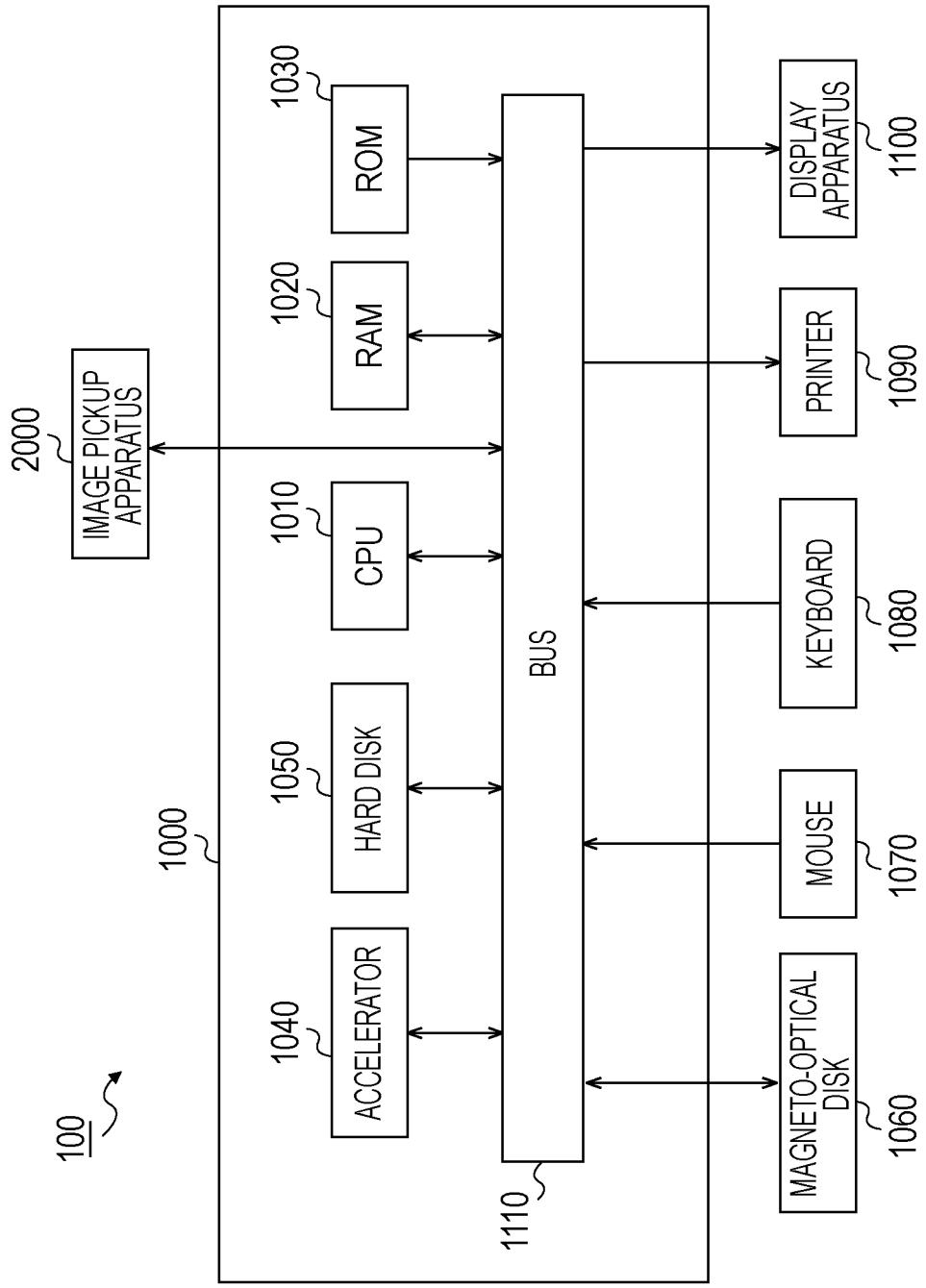
FIG. 9 is a block diagram of an exemplary hardware configuration of the X-ray fluoroscopic apparatus (image processing apparatus) according to the first exemplary embodiment of the present invention.

FIG. 9 is a block diagram of an exemplary hardware configuration of the X-ray fluoroscopic apparatus (image processing apparatus) according to the first exemplary embodiment of the present invention.

The X-ray fluoroscopic apparatus 100 includes an information processing apparatus 1000, and also includes a magneto-optical disk 1060, a mouse 1070, a keyboard 1080, a printer 1090, a display apparatus 1100, and an image pickup apparatus 2000 which are all connected to the information processing apparatus 1000 in a state capable of communicating with one another.

The information processing apparatus 1000 is constituted, for example, by a general personal computer (PC) or a computer such as a work station (WS). The information processing apparatus 1000 includes a CPU 1010, a RAM 1020, a ROM 1030, an accelerator 1040, a hard disk 1050, and a bus 1110.

The CPU 1010 executes entire control of the information processing apparatus 1000 by using programs and data which are held (stored) in, e.g., the ROM 1030, the hard disk 1050, or the magneto-optical disk 1060. In other words, the CPU 1010 executes various processes performed in the X-ray fluoroscopic apparatus (image processing apparatus) 100 according to this exemplary embodiment.

The RAM 1020 has a memory area for temporarily storing programs and data which are loaded from the ROM 1030, the hard disk 1050, or the magneto-optical disk 1060. Further, the RAM 1020 has a memory area for temporarily storing image data, etc. which is obtained from the image pickup apparatus 2000. Additionally, the RAM 1020 has a work area used when the CPU 1010 executes various processes.

The ROM 1030 stores setting data and a boot program for the information processing apparatus 1000. The accelerator 1040 increases the processing capability of the information processing apparatus 1000. For example, the accelerator 1040 serves to execute a part of the processing executed by the CPU 1010 and to reduce the load of the CPU 1010.

The hard disk 1050 holds programs and data necessary for causing the CPU 1010 to execute various processes which are executed by, e.g., the OS (Operating System) and the functional components shown in FIG. 1. Those programs and data are loaded in the RAM 1020, as required, in accordance with the control by the CPU 1010 and are processed by the CPU 1010. Also, image data of the moving image can be stored in the hard disk 1050.

The magneto-optical disk 1060 stores, e.g., the image data of the moving image. The magneto-optical disk 1060 can also store a part or the whole of the programs and the data stored in the hard disk 1050.

The mouse 1070 and the keyboard 1080 are input devices operated by, e.g., the operator when entering an input to the information processing apparatus 1000.

The printer 1090 prints an image based on the image data for outputting thereof. The display apparatus 1100 is constituted by, e.g., a CRT display or a liquid crystal display, and it displays the image based on the image data, characters, etc. for outputting thereof.

The bus 1110 connects the CPU 1010 to the other components of the X-ray fluoroscopic apparatus 100 in a state capable of communicating therebetween.

In this exemplary embodiment, for example, the image pickup apparatus 2000 corresponds to the X-ray generator 101 and the two-dimensional X-ray sensor 102 shown in FIG. 1. Also, the pre-processing unit 103, the feature information acquiring unit 106, the image processing unit 107, and the X-ray control unit 109, shown in FIG. 1, are constituted by the CPU 1010 and the programs, etc. stored in the ROM 1030, the hard disk 1050, or the magneto-optical disk 1060. The parameter input unit 104 is constituted by the mouse 1070 and the keyboard 1080. The target region extracting unit 105 is constituted by the CPU 1010, the programs, etc. stored in the ROM 1030, the hard disk 1050, or the magneto-optical disk 1060, as well as by the RAM 1020. In addition, the printer 1090 and the display apparatus 1100 correspond to the image output unit 108 shown in FIG. 1.

The image pickup apparatus 2000 captures a moving image of the subject 200. Image data of the captured moving image is supplied to the information processing apparatus 1000. At that time, the image pickup apparatus 2000 can supply a plurality of image data together to the information processing apparatus 1000, or can supply each image data one after another whenever the moving image is captured. The information processing apparatus 1000 sends setting of the X-ray emission condition and a radiographic run command for a next frame to the X-ray control unit 109 shown in FIG. 1.

A second exemplary embodiment will be described below.

An X-ray fluoroscopic apparatus (image processing apparatus) according to a second exemplary embodiment has a similar functional configuration to that of the X-ray fluoroscopic apparatus according to the first exemplary embodiment shown in FIG. 1. The X-ray fluoroscopic apparatus according to the second exemplary embodiment differs from that according to the first exemplary embodiment in an internal configuration of the target region extracting unit 105.

Figure 10:
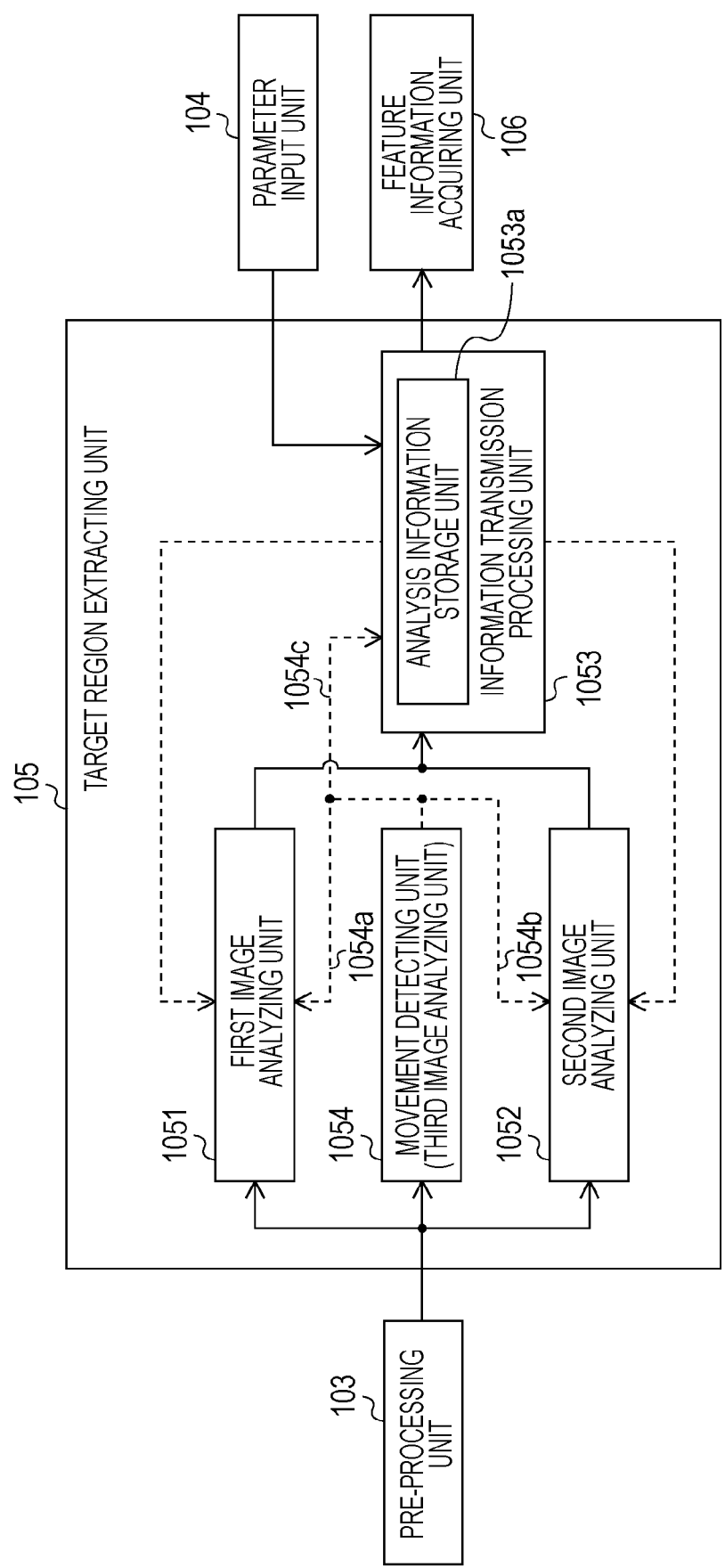
FIG. 10 is a block diagram of an exemplary internal configuration of a target region extracting unit in an X-ray fluoroscopic apparatus (image processing apparatus) according to a second exemplary embodiment of the present invention.

FIG. 10 is a block diagram of the exemplary internal configuration of the target region extracting unit in the X-ray fluoroscopic apparatus (image processing apparatus) according to the second exemplary embodiment of the present invention.

More specifically, the target region extracting unit 105 in the second exemplary embodiment is constituted by adding, to the target region extracting unit in the first exemplary embodiment shown in FIG. 2, a movement detecting unit (third image analyzing unit) 1054 which detects a movement of the subject 200 (i.e., a subject movement) from each frame of a moving image. The movement detecting unit (third image analyzing unit) 1054 executes an image analyzing process for each frame of the moving image of the subject 200, thereby detecting whether the subject 200 has moved.

In response to the result of detecting the movement of the subject 200, the movement detecting unit 1054 instructs each of the first image analyzing unit 1051 and the second image analyzing unit 1052 to interrupt or start the image analyzing process. Further, in response to the result of detecting the movement of the subject 200, the movement detecting unit 1054 instructs the information transmission processing unit 1053 to overwrite the analysis information held in the analysis information storage unit 1053*a* with the edge position information of the predetermined region, which is entered from the parameter input unit 104. Herein, the analysis information held in the analysis information storage unit 1053*a* is, for example, the edge position information based on the target region, which has been obtained as the result of the image analyzing process executed by the first image analyzing unit 1051 or the second image analyzing unit 1052.

In the following description, it is assumed that the image currently being an image analysis target is an image of an n-th frame, the analysis range of the second image analyzing unit 1052 for the image of the n-th frame is An, and the brightness gradient absolute value at coordinates (x, y) on the image of the n-th frame is Gn(x, y). In such a case, a subject movement Mn with respect to an image of a preceding frame, i.e., an image of an (n−1)-th frame, can be expressed by the following formula (2):

$$M_n = \left| \sum_{(x,y) \in A_n} G_n(x-y) - \sum_{(x,y) \in A_{n-1}} G_{n-1}(x, y) \right| \quad (2)$$

The formula (2) in fact represents a change in the brightness intensity at the edge of the target region, which is present in the analysis range of the second image analyzing unit 1052, between successive frames. When the subject movement Mn is large, this means that the edge of the target region has moved beyond the analysis range of the second image analyzing unit 1052. The movement detecting unit 1054 in this exemplary embodiment determines that a large subject movement occurs in the image of the n-th frame and the second image analyzing unit 1052 cannot execute the process of extracting the target region, when the following formula (3) is satisfied for a threshold T which is experimentally obtained:

$$Mn > T \quad (3)$$

Further, the movement detecting unit 1054 determines that, when the first image analyzing unit 1051 is in the progress of executing the image analyzing process for an image prior to the image of the (n−1)-th frame, the result of the relevant image analyzing process has no significance for images subsequent to the image of the n-th frame in which the large subject movement has occurred.

When the image analysis result by the movement detecting unit 1054 satisfies the formula (3) and the first image analyzing unit 1051 is in the progress of executing the image analyzing process for an image prior to the image of the (n−1)-th frame, the movement detecting unit 1054 issues an instruction to interrupt the image analyzing process being executed (1054*a*). Further, the movement detecting unit 1054 instructs the first image analyzing unit 1051 to start the image analyzing process for the image of the n-th frame (1054*a*).

At that time, because the image analysis result by the second image analyzing unit 1052 has no reliability, the movement detecting unit 1054 instructs the second image analyzing unit 1052 to interrupt outputting of the result of the image analyzing process (1054*b*). Further, the movement detecting unit 1054 instructs the information transmission processing unit 1053 to overwrite the analysis information held in the analysis information storage unit 1053*a* with the edge position information of the predetermined region I304, which is entered from the parameter input unit 104 (1054*c*).

According to the X-ray fluoroscopic apparatus 100 of this exemplary embodiment, as described above, when the movement detecting unit (third image analyzing unit) 1054 detects a subject movement larger than the preset threshold T, the image analysis result obtained from the image before the occurrence of the subject movement is erased. Therefore, a more important image analyzing process after the occurrence of the subject movement can be quickly started. In addition, it is possible to avoid a risk that the process of acquiring the feature information is improperly executed by using the target region obtained with the image before the occurrence of the subject movement, and that the image processing and the X-ray control are erroneously executed.

A third exemplary embodiment will be described below.

An X-ray fluoroscopic apparatus (image processing apparatus) according to a third exemplary embodiment has a similar functional configuration to that of the X-ray fluoroscopic apparatus according to the first exemplary embodiment shown in FIG. 1. Also, a target region extracting unit 105 in the third exemplary embodiment has a similar internal configuration to that of the target region extracting unit 105 in the first exemplary embodiment shown in FIG. 2. Alternatively, the target region extracting unit 105 in the third exemplary embodiment may have a similar internal configuration to that of the target region extracting unit 105 in the second exemplary embodiment shown in FIG. 10.

According to the third exemplary embodiment, in the X-ray fluoroscopy, a test run of radiography with a test emission is performed prior to the start of the X-ray fluoroscopy. Stated another way, in a moving image captured in the third exemplary embodiment, at least a first frame is one obtained with the test run of radiography in which the X-ray 101*a* is emitted from the X-ray generator 101 under X-ray emission conditions (radiation emission conditions) suitable for extracting the target region. The operation of an image analyzing process from the test emission to the start of the X-ray fluoroscopy (main radiography) in the third exemplary embodiment will be described below with reference to FIGS. 11 and 12.

Figure 11:
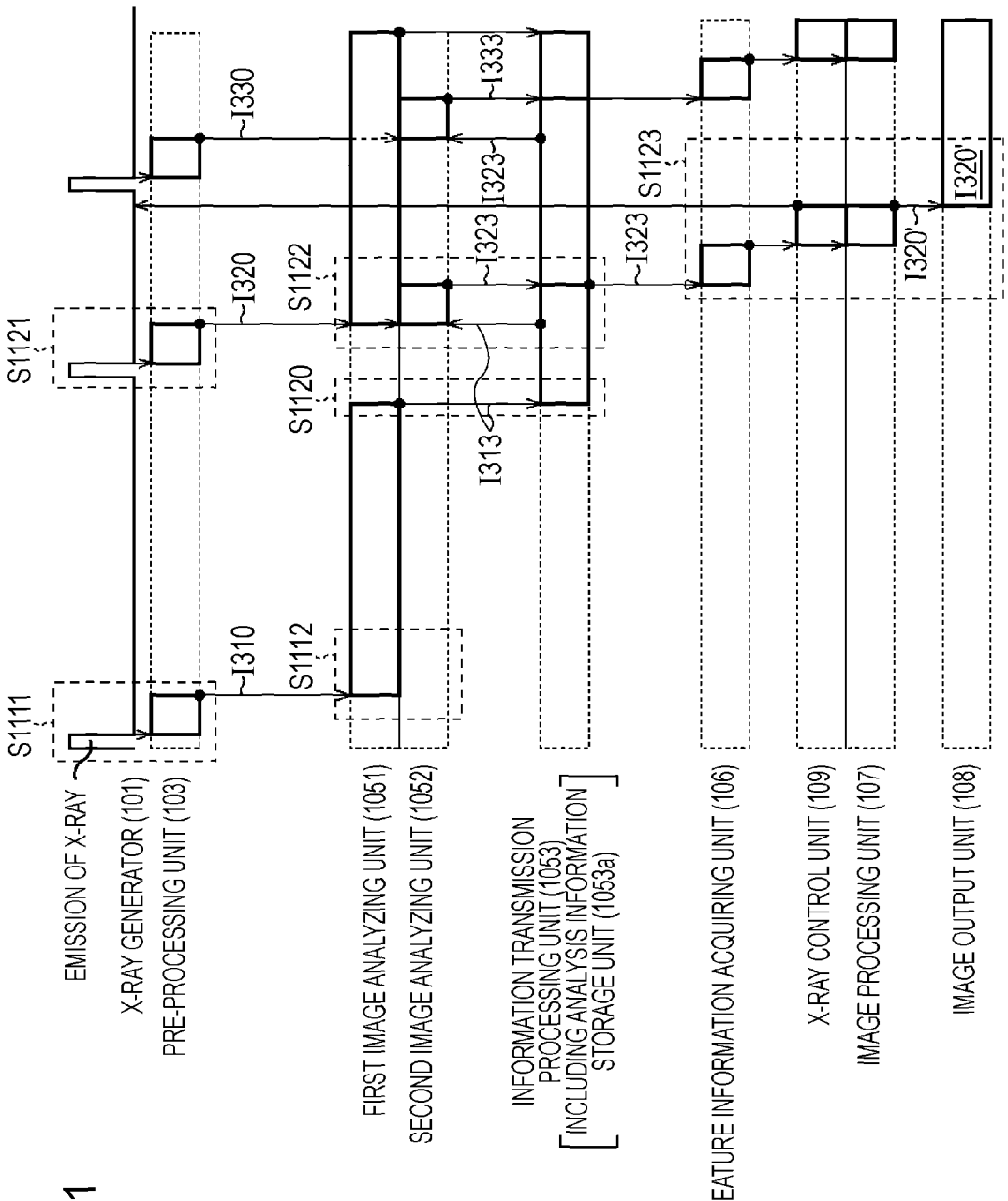
FIG. 11 is a timing chart illustrating one example of processing operations in an X-ray fluoroscopic apparatus (image processing apparatus) according to a third exemplary embodiment of the present invention.
Figure 12:
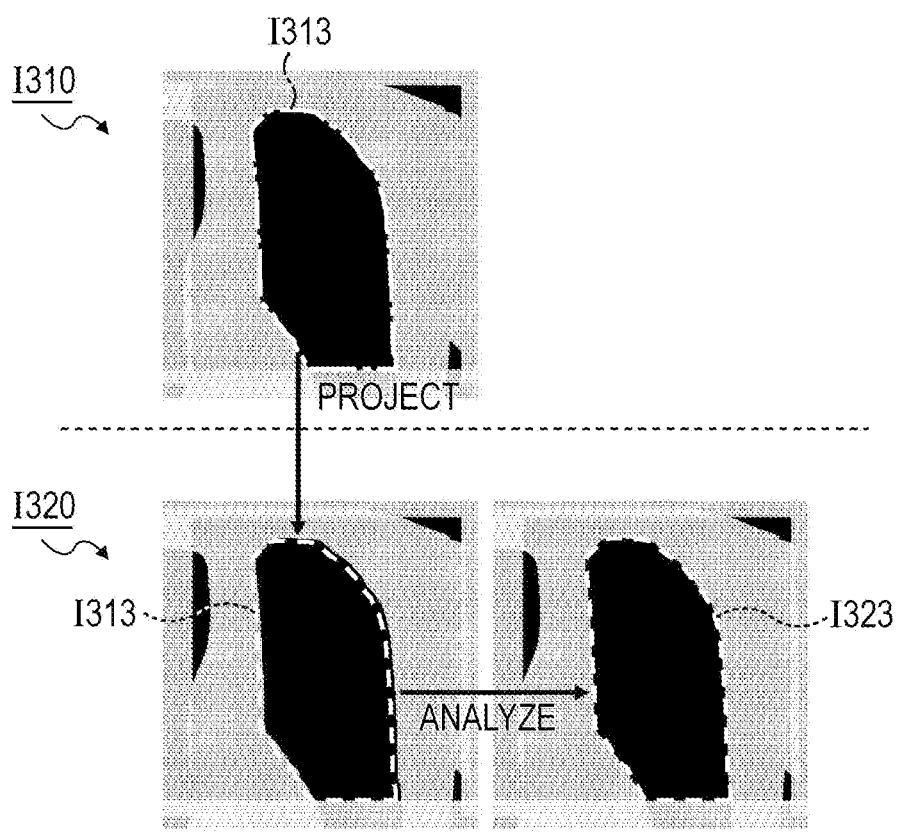
FIG. 12 illustrates images showing an exemplary flow of a process of extracting the target region, which is executed in the X-ray fluoroscopic apparatus (image processing apparatus) according to the third exemplary embodiment of the present invention.

FIG. 11 is a timing chart illustrating one example of processing operations in the X-ray fluoroscopic apparatus (image processing apparatus) according to the third exemplary embodiment of the present invention. FIG. 12 illustrates images showing an exemplary flow of a process of extracting the target region, which is executed in the X-ray fluoroscopic apparatus (image processing apparatus) according to the third exemplary embodiment of the present invention.

After completion of preparations for the X-ray fluoroscopy, the X-ray generator 101 first emits, in step S1111 of FIG. 11, a test pulse of the X-ray 101*a* to the subject 200, thereby executing a test emission. In the test emission, X-ray emission conditions (e.g., a higher tube voltage and a lower tube current of the X-ray generator 101) intended for only the process of extracting the target region are desirably set such that exposure to the subject 200 is suppressed.

The X-ray 101*a* for the test emission passes through the subject 200 while gradually attenuating, and enters the two-dimensional X-ray sensor 102. The two-dimensional X-ray sensor 102 produces and outputs an X-ray image with the test emission. The pre-processing unit 103 executes pre-processing, such as an offset correction process and a gain correction process, on the X-ray image output from the two-dimensional X-ray sensor 102. The X-ray image with a test run of the radiography, which has been subjected to the pre-processing in the pre-processing unit 103, is provided as an initial X-ray image I310 shown in FIG. 12.

In step S1112 of FIG. 11, the target region extracting unit 105 starts a process of extracting the target region from the initial X-ray image I310 which has been subjected to the pre-processing in the pre-processing unit 103. More specifically, the process of step S1112 in FIG. 11 is executed as follows.

In this exemplary embodiment, only the process extracting the target region by the first image analyzing unit 1051 is executed, and the process extracting the target region by the second image analyzing unit 1052 is not executed. The result of the image analyzing process by the first image analyzing unit 1051 is output after the lapse of a time corresponding to two frames. In other words, the result of the process of extracting the target region by the first image analyzing unit 1051 is not yet output at timing of step S1112. At the timing of step S1112, therefore, the feature information acquiring unit 106, the image processing unit 107, the image output unit 108, and the X-ray control unit 109 are not operated.

While only the first image analyzing unit 1051 is operated in step S1112 in the above description, the exemplary embodiment can be modified, for example, as follows. The second image analyzing unit 1052 also simultaneously starts the image analyzing process for the X-ray image I310 to provide the result of the image analyzing process in cooperation with the first image analyzing unit 1051. Such a modification can shorten the time of the image analyzing process required for the X-ray image I310.

Also, while the feature information acquiring unit 106, the image processing unit 107, and the image output unit 108 are not operated in step S1112 in the above description, the exemplary embodiment can be modified, for example, as follows. Feature information for an initial X-ray image is previously set in the parameter input unit 104 to execute image processing by the image processing unit 107, and the result of the image processing is output (for, e.g., display thereof) to the image output unit 108. As an alternative, the image output unit 108 can also provide an output (view) indicating a status under the test emission and/or an output (view) indicating the processing time until the end of the initial image analyzing process.

In step S1120 of FIG. 11, after completion of the image analyzing process for the initial X-ray image I310, the first image analyzing unit 1051 writes, in the analysis information storage unit 1053a, edge position information of based on a target region I313 provided as the result of the relevant image analyzing process. The target region I313 is obtained with a detailed image analysis made on all pixels of the initial X-ray image I310. Therefore, a desired target region can be provided.

In step S1121 of FIG. 11, the X-ray fluoroscopic apparatus 100 of this exemplary embodiment starts the X-ray fluoroscopy, i.e., the main radiography. More specifically, when the X-ray fluoroscopy is started, the X-ray generator 101 emits the X-ray 101a of a first pulse for the main radiography toward the subject 200. Thereafter, a process similar to that of step S711 in FIG. 7, for example, is executed until the pre-processing in the pre-processing unit 103, whereby an X-ray image I320 of a first frame in the main radiography, shown in FIG. 12, is produced.

In step S1122 of FIG. 11, the target region extracting unit 105 starts a process of extracting the target region from the X-ray image I320 of the first frame in the main radiography, which has been subjected to the pre-processing in the pre-processing unit 103. More specifically, the process of step S1122 in FIG. 11 is executed as follows.

Because the image analyzing process for the initial X-ray image I310 is already completed, the first image analyzing unit 1051 starts the image analyzing process for the X-ray image I320 of the first frame in the main radiography. Herein, the result of extracting the target region by the first image analyzing unit 1051 is output after two frames.

The second image analyzing unit 1052 reads and projects, as shown in FIG. 12, the edge position information of the target region I313, which is currently held in the analysis information storage unit 1053a, onto the X-ray image I320 of the first frame in the main radiography. The second image analyzing unit 1052 then analyzes a region near the edge position based on the target region I313, shown in FIG. 12, for the X-ray image I320 of the first frame in the main radiography to extract a target region I323 of the first frame in the main radiography, shown in FIG. 12. Further, the second image analyzing unit 1052 writes edge position information based on the target region I323 in the analysis information storage unit 1053a. At that time, the second image analyzing unit 1052 overwrites the edge position information based on the target region I313 with the edge position information based on the target region I323, for example, so that the latter is held (stored) in the analysis information storage unit 1053a. Further, the target region extracting unit 105 outputs the edge position information with respect to the target region I323, as target-region extraction result information of the first frame in the main radiography, to the feature information acquiring unit 106.

In step S1123 of FIG. 11, the feature information acquiring unit 106 acquires feature information on the basis of the edge position information with respect to the target region I323 (i.e., the target-region extraction result information of the first frame in the main radiography) which is output from the target region extracting unit 105.

The image processing unit 107 executes image processing for the X-ray image I320 of the first frame in the main radiography by using the feature information acquired by the feature information acquiring unit 106. Then, the image processing unit 107 outputs the X-ray image I320 after the image processing, as an X-ray image I320' of the first frame in the main radiography, to the image output unit 108. The image output unit 108 executes an outputting process of, e.g., displaying the X-ray image I320' of the first frame in the main radiography. On the other hand, the X-ray control unit 109 calculates X-ray emission conditions of the X-ray generator 101 regarding the X-ray fluoroscopy for a second frame in the main radiography by using the feature information acquired by the feature information acquiring unit 106. The process of the X-ray fluoroscopy for the first frame in the main radiography is thus completed.

According to the X-ray fluoroscopic apparatus 100 of this exemplary embodiment, as described above, prior to the start of the main radiography for the X-ray fluoroscopy, a test run of the radiography is performed with the test emission to produce the initial X-ray image I310. Further, according to the X-ray fluoroscopic apparatus 100 of this exemplary embodiment, the main radiography is performed after executing the image analyzing process on the initial X-ray image I310 by the first image analyzing unit 1051.

As a result, the process of extracting an appropriate target region can be executed from the image of the first frame in the main radiography, and the image processing and the X-ray control can be more appropriately realized by executing the process of acquiring the feature information on the basis of the appropriate target region. Further, exposure to the subject 200 can be suppressed by setting the X-ray emission conditions, which have been used in the test emission, for the process of extracting the target region.

The various steps, shown in FIGS. 4, 6, 7 and 11, representing the image processing method for the X-ray fluoroscopic apparatus 100 according to each of the above-described exemplary embodiments can be realized with the operation of programs stored in the ROM 1030, the hard disk 1050, or the magneto-optical disk 1060. The programs and a computer-readable storage medium recording the programs are also included within the scope of the present invention.

In practice, the programs are supplied to a computer through a storage medium, such as a CD-ROM, recording the programs or via various transmission media. In addition to the CD-ROM, the storage medium recording the programs can be provided as, e.g., a flexible disk, a hard disk, a magnetic tape, a magneto-optical disk, or a non-volatile memory card. The program transmission media can be communication media used in a system of a computer network (e.g., LAN, WAN such as the Internet, or a wireless communication network) for supplying program information as propagation of carrier waves. Examples of the communication media include wired lines, such as optical fibers, and wireless lines.

The present invention is not limited to the case in which the functions of the X-ray fluoroscopic apparatus 100 according to the exemplary embodiments are realized with a computer executing programs supplied to it. In some cases, the functions of the X-ray fluoroscopic apparatus 100 according to the exemplary embodiments are realized with programs cooperating with the OS (Operating System) operating on the computer, other application software, etc. The programs used in such a case can also be included within the scope of the present invention. In other cases, the functions of the X-ray fluoroscopic apparatus 100 according to the exemplary embodiments are realized by executing the whole or a part of processes of the supplied programs with a function expansion board or a function expansion unit of the computer. The programs used in such a case can also be included within the scope of the present invention.

The above-described exemplary embodiments merely represent concrete examples in implementing the present invention, and the technical scope of the present invention should not be construed in a limiting sense by the above-described exemplary embodiments. In other words, the present invention can be practiced in various forms without departing from the technical concept and the primary features of the present invention.

This application claims the benefit of Japanese Patent Application No. 2007-298272 filed Nov. 16, 2007, which is hereby incorporated by reference herein in its entirety.

What is claimed is:

1. An image processing apparatus comprising:
a processor and memory;
a target region extracting unit configured to execute a plurality of image analyzing processes that are each performed in a different manner, each process for extraction of a target region designated within a frame of a series of frames that capture a moving image, wherein execution of the plurality of image analyzing processes on a plurality of frames from the series of frames yields a respective plurality of extracted target regions from the series of frames;
an information transmission processing unit configured to communicate result information from at least one of the plurality of extracted target regions among the plurality of image analyzing processes; and
a feature information acquisition unit configured to acquire feature information on a basis of at least one of the plurality of extracted target regions extracted from the plurality of image analyzing processes.

2. The image processing apparatus according to claim 1, wherein each of the image analyzing processes is at least one of a histogram analysis process, an edge detection process with spatial filtering, a Hough transform process, a morphological operation process, or a pattern matching process.

3. The image processing apparatus according to claim 1, wherein the target region extracting unit includes at least a first image analysis unit configured to execute a first image analysis process for an entire area of each frame of the moving image, and
a second image analysis unit configured to execute a second image analyzing process for a partial area of each frame of the moving image.

4. The image processing apparatus according to claim 3, wherein, by using result information from the first image analysis unit or the second image analysis unit up to a preceding frame, the second image analysis unit executes the second image analyzing process for the partial area of a frame currently under the image analyzing process on the basis of the result information.

5. The image processing apparatus according to claim 1, further comprising a movement detecting unit configured to detect a subject movement on the basis of each frame of the moving image,
wherein the movement detecting unit instructs the target region extracting unit to start or interrupt the plurality of image analyzing processes depending on a detection result of the subject movement.

6. The image processing apparatus according to claim 1, wherein the information transmission unit includes an information storage unit configured to store at least part of result information from the plurality of image analyzing processes.

7. The image processing apparatus according to claim 1, wherein the feature information acquisition unit acquires the feature information from each frame of the moving image, on the basis of at least one of the extracted target regions extracted by the target region extracting unit, the feature information representing at least one of a position, a size, a shape, an average brightness value, a maximum brightness value, a minimum brightness value, a position of barycenter, a variance, or a standard deviation of the relevant target region.

8. The image processing apparatus according to claim 1, further comprising an image processing unit configured to execute image processing for at least one frame of the moving image on the basis of the feature information acquired by the feature information acquisition unit.

9. The image processing apparatus according to claim 8, wherein the target region extracting unit executes, for at least one frame of the moving image, at least one of a gray level conversion process, a sharpening process, a noise suppression process, or a process of cutting out the target region.

10. The image processing apparatus according to claim 1, wherein the moving image contains a series of images captured by radiation fluoroscopy based on radiation generated from a radiation generating unit toward the subject.

11. The image processing apparatus according to claim 1, further comprising an image acquisition unit configured to acquire a plurality of radiation image frames as the moving image.

12. A radiation imaging apparatus comprising:
a target region extracting unit configured to execute a plurality of image analyzing processes that are each performed in a different manner, each process for extraction of a target region designated within a frame of a series of frames that capture a moving image, wherein execution of the plurality of image analyzing processes on a plurality of frames from the series of frames yields a respective plurality of extracted target regions from the series of frames;

an information transmission processing unit configured to communicate result information from at least one of the plurality of extracted target regions among the plurality of image analyzing processes;

a feature information acquisition unit configured to acquire feature information on a basis of at least one of the plurality of extracted target regions extracted from the plurality of image analyzing processes;

a radiation generating unit configured to generate a radiation toward a subject when the moving image is captured; and a radiation control unit configured to control the radiation generated from the radiation generating unit on the basis of the feature information acquired by the feature information acquisition unit.

13. The image processing apparatus according to claim 12, wherein at least one frame of the moving image is a frame obtained by a test run of radiography in which the radiation is generated from a radiation generating unit under radiation emission conditions suitable for extracting the target region.

14. The radiation imaging apparatus according to claim 12, further comprising a radiation sensor configured to generate the moving image by detecting radiation emitted from the radiation generating unit.

15. The radiation imaging apparatus comprising:
a target region extracting unit configured to execute a plurality of image analyzing processes that are each performed in a different manner, each process for extraction of a target region designated within a frame of a series of frames that capture a moving image, wherein execution of the plurality of image analyzing processes on a plurality of frames from the series of frames yields a respective plurality of extracted target regions from the series of frames;

an information transmission processing unit configured to communicate result information from at least one of the plurality of extracted target regions among the plurality of image analyzing processes;

a feature information acquisition unit configured to acquire feature information on a basis of at least one of the plurality of extracted target regions extracted from the plurality of image analyzing processes; and a radiation sensor configured to generate the moving image by detecting radiation emitted from a radiation generating unit.

16. An image processing method for controlling an image processing apparatus that includes a processor and memory which executes the method, the method comprising:
executing, by at least one image analysis unit, a plurality of image analyzing processes that are each performed in a different manner, each process for extraction of a target region designated within a frame of a series of frames that capture a moving image, wherein execution of the plurality of image analyzing processes on a plurality of frames from the series of frames yields a respective plurality of extracted target regions from the series of frames;

communicating result information from at least one of the plurality of extracted target regions among the plurality of image analyzing processes; and acquiring feature information on a basis of at least one of the plurality of extracted target regions extracted from the plurality of image analyzing processes.

17. A non-transitory computer-readable medium containing computer-executable instructions to be performed in an image processing apparatus, the medium comprising:
computer-executable instructions for executing, by at least an image analysis unit, a plurality of image analyzing processes that are each performed in a different manner, each process for extraction of a target region designated within a frame of a series of frames that capture a moving image, wherein execution of the plurality of image analyzing processes on a plurality of frames from the series of frames yields a respective plurality of extracted target regions from the series of frames;

computer-executable instructions for communicating result information from at least one of the plurality of extracted target regions among the plurality of image analyzing processes; and computer-executable instructions for acquiring feature information on a basis of at least one of the plurality of extracted target regions extracted from the plurality of image analyzing processes.

* * * * *